US012792591B2

(12) United States Patent
Hayashi

(10) Patent No.: US 12,792,591 B2
(45) Date of Patent: Nov. 10, 2026

(54) DATA RECORDING APPARATUS, ELECTRONIC CONTROL APPARATUS, AND DATA RECORDING METHOD

(71) Applicant: Astemo, Ltd., Tokyo (JP)

(72) Inventor: Ryosuke Hayashi, Hitachinaka (JP)

(73) Assignee: Astemo, Ltd., Tokyo (JP)

( * ) Notice: Subject to any disclaimer, the term of this patent is extended or adjusted under 35 U.S.C. 154(b) by 0 days.

(21) Appl. No.: 19/140,210

(22) PCT Filed: May 26, 2023

(86) PCT No.: PCT/JP2023/019651
§ 371 (c)(1),
(2) Date: Jun. 17, 2025

(87) PCT Pub. No.: WO2024/246978
PCT Pub. Date: Dec. 5, 2024

(65) Prior Publication Data

US 2026/0211868 A1 Jul. 23, 2026

(51) Int. Cl.
*G06F 16/23* (2019.01)
*G06F 16/29* (2019.01)

(52) U.S. Cl.
CPC .......... *G06F 16/2365* (2019.01); *G06F 16/29* (2019.01)

(58) Field of Classification Search
CPC ............................. G06F 16/2365; G06F 16/29
See application file for complete search history.

(56) References Cited

U.S. PATENT DOCUMENTS

2014/0188386 A1 7/2014 Obara
2016/0259814 A1 9/2016 Mizoguchi
2020/0012887 A1* 1/2020 Li ...................... G06F 18/2155

FOREIGN PATENT DOCUMENTS

JP 2014-130232 A 7/2014
JP 2016-161456 A 9/2016
JP 2021-135380 A 9/2021

OTHER PUBLICATIONS

International Search Report Issued in PCT Application No. PCT/JP2023/019651 dated Jul. 11, 2023, with English Translation.

* cited by examiner

*Primary Examiner* — Rodney A Butler
(74) *Attorney, Agent, or Firm* — Foley & Lardner LLP

(57) ABSTRACT

A data recording apparatus includes: a computing apparatus that executes computing processing; and a storage unit that is accessible from the computing apparatus, in which the computing apparatus includes: a data recording trigger determining unit in which the computing apparatus determines a difference between outer world recognition information representing a recognized object and map data around an ego-vehicle position, and establishes attribute information including a data recording trigger representing an object having resulted in the difference, as well as video data related to the difference, as difference data to be recorded; a data amount reduction condition determining unit in which the computing apparatus compares the attribute information of the difference data to be recorded, with attribute information of difference data recorded in past, and determines whether a same scene has been recorded in the past; and a data recording unit in which the computing apparatus executes data amount reduction processing for reducing a data amount of the difference data, when the same scene has been recorded in the past.

7 Claims, 7 Drawing Sheets

FIG. 5

| RECORDED DATA ID | DATE AND TIME | LATITUDE | LONGITUDE | LANE ID | TRIGGER ID |
|---|---|---|---|---|---|
| 1 | 2023-01-01-0947 | 36.424077 | 140.519522 | 1 | 12 |
| 2 | | | | | |
| 3 | | | | | |

DATA TABLE

*FIG. 6*

| AVAILABLE CAPACITY IN DIFFERENCE DATA STORAGE AREA | TEXT DATA | VIDEO DATA | |
|---|---|---|---|
| | | LENGTH | bit rate [Kbps] |
| ≥80% | ON | Full | 4096 |
| 80%≥50% | ON | Full | 2048 |
| 50%≥30% | ON | 1 frame | – |
| 30%≥15% | ON | OFF | – |
| <15% | OFF | OFF | – |

FIG. 7

| RECORDED DATA ID | DATE AND TIME | LATITUDE | LONGITUDE | LANE ID | TRIGGER ID | VEHICLE ID |
|---|---|---|---|---|---|---|
| 1 | 2023-01-01-0947 | 36.424077 | 140.519522 | 1 | 23 | 0 |
| 2 | 2023-01-03-1108 | 36.411111 | 140.485169 | 4 | 50 | 10982 |
| 3 | | | | | | |

DATA TABLE

DATA RECORDING APPARATUS, ELECTRONIC CONTROL APPARATUS, AND DATA RECORDING METHOD

TECHNICAL FIELD

The present invention relates to a data recording apparatus.

BACKGROUND ART

Vehicles are equipped with data recording apparatuses for recording data, such as vehicle control data, data of operations made by occupants, and video data acquired by sensors, at the time of an accident or a failure. In recent years, vehicles have come to be required to record data at higher frequency. For example, map data used in an automatic driving function is mounted on a vehicle, the map data and actual environment data obtained by sensing are matched, and the difference between these pieces of data is recorded for the purpose of updating map data.

As a background art in this field, there is PTL 1 (JP 2016-161456 A). In PTL 1, a map data calculation unit calculates second map data on the basis of a recognition result of the surrounding environment and on traveling conditions of the vehicle, and an update data calculation unit calculates the update data from the map data calculated by the map data calculation unit, on the basis of reliability. Also disclosed is causing an update determining unit to compare the map data in a map database DB with the update data, and, when the error between these two pieces of data exhibits a deviation equal to or more than a determination value, to determine whether the map data is to be updated on the basis of frequency and reliability of such a deviation. With this, a map data processing apparatus gets a grasp of the difference between the detailed map database that is used for driving control and the actual road settings/environment accurately, and maintains the map database to the latest condition.

CITATION LIST

Patent Literature

PTL 1: JP 2016-161456 A

SUMMARY OF INVENTION

Technical Problem

It is possible to update the map data to the latest condition using the actual environment data collected from each vehicle, in the manner described above. PTL 1 discloses a technique for getting grasp of a difference between a map database, and an actual road setting and environment, and quantitatively evaluating the difference, for the purpose of maintaining the database in the latest condition. However, because the capacity of a memory for recording data mounted on a vehicle is limited, it is difficult to keep recording a large amount of data over a long time period. Even in a configuration in which data is uploaded to a server at the time when a network connection is established and the recorded data is erased, a large amount of data is kept being recorded until the network connection is established, and the memory becomes depleted. In this manner, there has been a demand for a technique for reducing the amount of data to be recorded.

Solution to Problem

A representative example of the invention disclosed in the present application is as follows. In other words, a data recording apparatus is characterized in including: a computing apparatus that executes computing processing; and a storage unit that is accessible from the computing apparatus, in which the computing apparatus includes: a data recording trigger determining unit in which the computing apparatus determines a difference between outer world recognition information representing a recognized object and map data around an ego-vehicle position, and establishes attribute information including a data recording trigger representing an object having resulted in the difference, as well as video data related to the difference, as difference data to be recorded; a data amount reduction condition determining unit in which the computing apparatus compares the attribute information of the difference data to be recorded, with attribute information of difference data recorded in past, and determines whether a same scene has been recorded in the past; and a data recording unit in which the computing apparatus executes data amount reduction processing for reducing a data amount of the difference data, when the same scene has been recorded in the past.

Advantageous Effects of Invention

According to one aspect of the present invention, a larger number of scenes can be recorded in the same storage capacity. Problems, configurations, and effects other than those described above will be clear from the following description of the embodiments.

BRIEF DESCRIPTION OF DRAWINGS

FIG. 5 is a diagram illustrating one example of a configuration of a data table that retains attribute information associated with a difference data body according to the first embodiment.

FIG. 6 is a diagram illustrating an example of a configuration of a data amount reduction processing table according to a second embodiment.

FIG. 7 is a diagram illustrating one example of a configuration of a data table that retains attribute information associated with a difference data body according to the third embodiment.

DESCRIPTION OF EMBODIMENTS

Embodiments of the present invention will now be described. Note that the embodiments described below illustrate preferred examples, and the present invention is not limited to the embodiments described below, and may be implemented by making an appropriate addition, change, deletion, or the like to the configuration of each unit, within the scope not departing from the gist of the present invention.

In the following embodiments, an example in which the present invention is applied to a vehicle system will be described. Generally, a system provided onboard a vehicle is different from an information processing system installed in a building such as a server, and the storage capacity of the onboard memory is often limited.

Because the storage capacity of the onboard memory is limited, the system prevents the depletion of the available capacity in the memory by limiting the conditions for data recording requests. Therefore, it has been a concern that data that should be recorded may be missed. To address this issue, the data recording apparatus according to a first embodiment of the present invention inhibits the same scenes from being recorded, by dynamically changing the amount of data to be recorded, using the configuration and the processing described below, for example, so that a larger number of scenes is recorded even if the memory capacity remains the same.

First Embodiment

A data recording apparatus according to the first embodiment of the present invention will now be described with reference to FIGS. 1 to 5.

Figure 1:
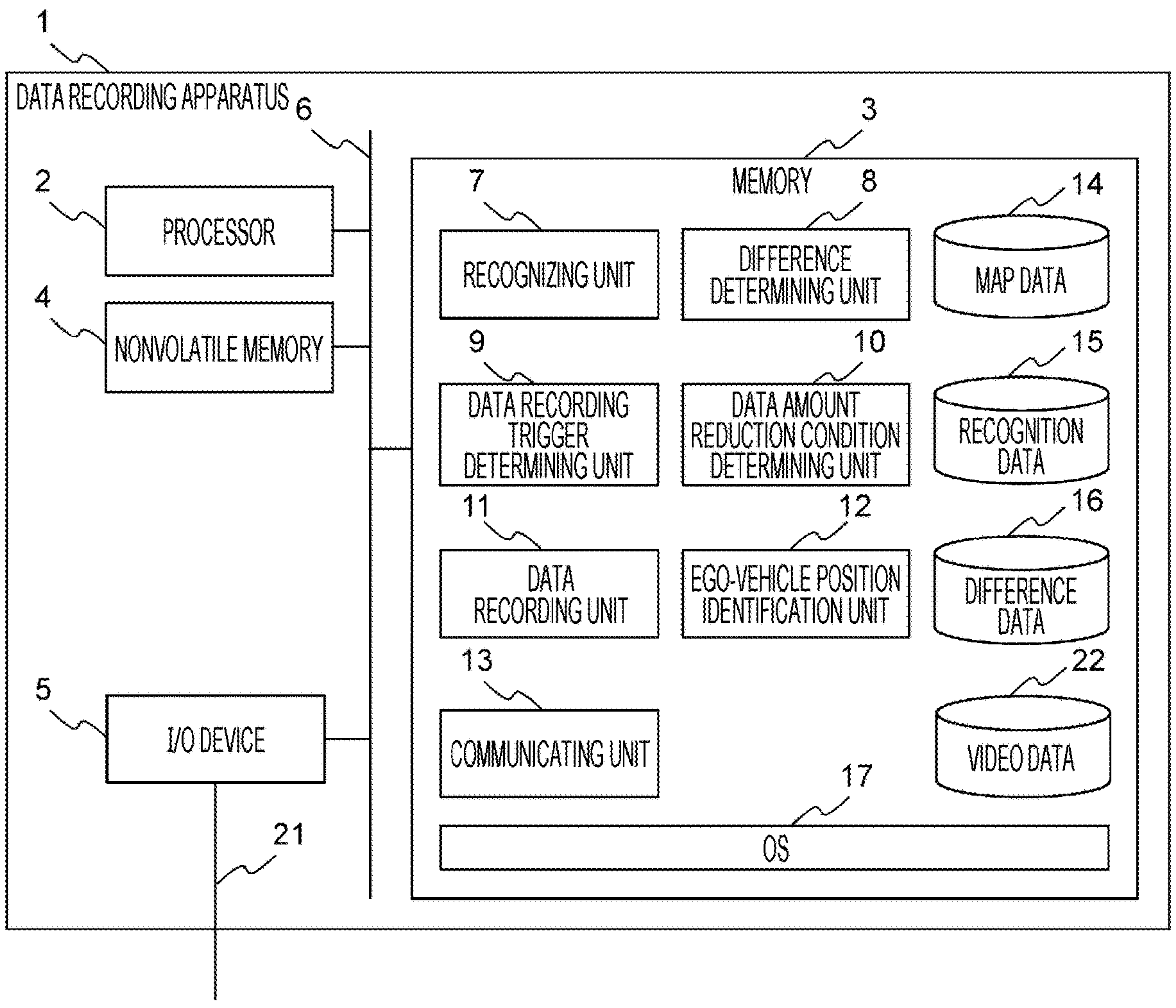
FIG. 1 is a block diagram illustrating a data recording apparatus according to a first embodiment.

FIG. 1 is a block diagram illustrating a data recording apparatus 1 according to the first embodiment.

The data recording apparatus 1 includes a processor 2, a memory 3, a nonvolatile memory 4, and an input/output (I/O) device 5. The processor 2, the memory 3, the nonvolatile memory 4, and the I/O device 5 are connected via an interconnect 6, and transmit and receive data.

The processor 2 is a computing apparatus that executes a program stored in the memory 3. The processor 2 executes various programs to implement functional units of the data recording apparatus 1. Note that a part of the processing performed by the processor 2 executing the program may be executed by another computing apparatus (e.g., hardware such as an ASIC and FPGA).

The I/O device 5 transmits and receives data to and from another apparatus connected over a network link 21. For the network link 21, for example, a controller area network (CAN), Ethernet, a camera serial interface 2 (CSI-2), or the like is used. A plurality of network links 21 may be connected as necessary, or different protocols may be used.

The memory 3 includes a high-speed and volatile storage element such as a dynamic random access memory (DRAM), and temporarily stores therein a program executed by the processor 2 and data used when the program is executed. Specifically, an operating system (OS) 17 and programs for executing a recognizing unit 7, a difference determining unit 8, a data recording trigger determining unit 9, a data amount reduction condition determining unit 10, a data recording unit 11, an ego-vehicle position identifying unit 12, and a communicating unit 13 are loaded onto the memory 3. The processor 2 is a computing apparatus that executes these programs. Onto the memory 3, map data 14, recognition data 15, difference data 16, and video data 22 are also loaded, and the processor 2 refers to these pieces of data. In the following description, for the sake of convenience, each of these units will be described as an entity executing a piece of processing, but the actual entity performing the processing is the processor 2.

The nonvolatile memory 4 includes a ROM and a flash memory that are nonvolatile storage elements, and stores therein an invariable program (e.g., BIOS), for example.

The recognizing unit 7, the difference determining unit 8, the data recording trigger determining unit 9, the data amount reduction condition determining unit 10, the data recording unit 11, the ego-vehicle position identifying unit 12, and the communicating unit 13 are pieces of software operating on the OS 17.

In the data recording apparatus 1 configured as described above, the difference determining unit 8 compares the recognition data 15 indicating an object recognized from the video data 22 by the recognizing unit 7, with the information obtained from the ego-vehicle position identifying unit 12 and the map data 14. The data recording trigger determining unit 9 determines whether recording of data is necessary, on the basis of the result of comparison performed by the difference determining unit 8. The data amount reduction condition determining unit 10 determines appropriate data amount reduction processing. The data recording unit 11 stores data in the difference data 16, in accordance with appropriate data amount reduction processing determined by the data amount reduction condition determining unit 10.

Note that the data recording apparatus 1 may be configured as a dedicated apparatus, but it is also possible for a part of the vehicle control apparatus to serve the function of the data recording apparatus 1.

Figure 2:
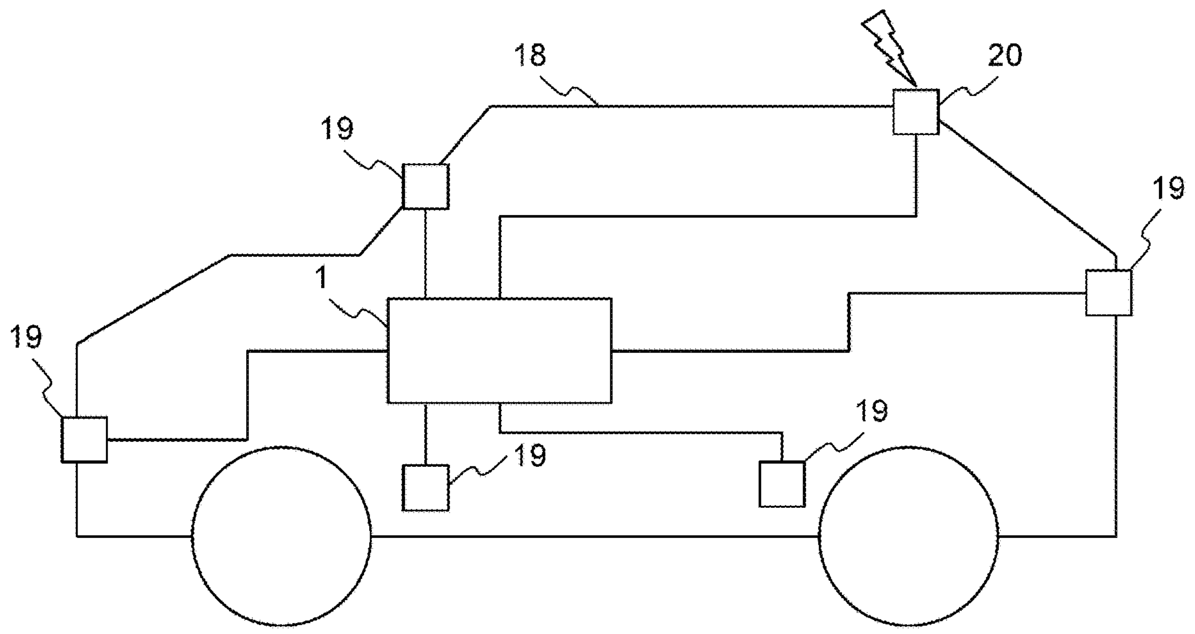
FIG. 2 is a diagram illustrating an outline of a vehicle system including the data recording apparatus according to the first embodiment.

FIG. 2 is a diagram illustrating an outline of a vehicle system 18 including the data recording apparatus 1 according to this embodiment.

The vehicle system 18 includes the data recording apparatus 1 in the vehicle.

A communicating apparatus 20 performs wireless communication with external of the vehicle system 18. For example, the communicating apparatus 20 performs communication using a protocol such as mobile phone communication, a wireless local area network (LAN), a wide area network (WAN), or the car-to-X (C2X) communication. The communicating apparatus 20 acquires information of the external world (infrastructures, other vehicles, map) through these types of communication, and transmits and receives information on the ego-vehicle, map data, and difference data. The communicating apparatus 20 also receives radio waves from a satellite, using a global navigation satellite system (GNSS).

To the data recording apparatus 1, a sensor 19 is connected. The sensor 19 includes an external sensor such as a camera, a radar, a LIDAR, or an ultrasonic sensor, and a mechanical system sensor that recognizes the conditions of the vehicle system 18 (such as a moving state, position information, acceleration, or a wheel speed), but a part of these types of listed sensors may be implemented as the sensor 19. These sensors 19 acquire information (video data 22) input from the external world, and output the information.

Figure 3:
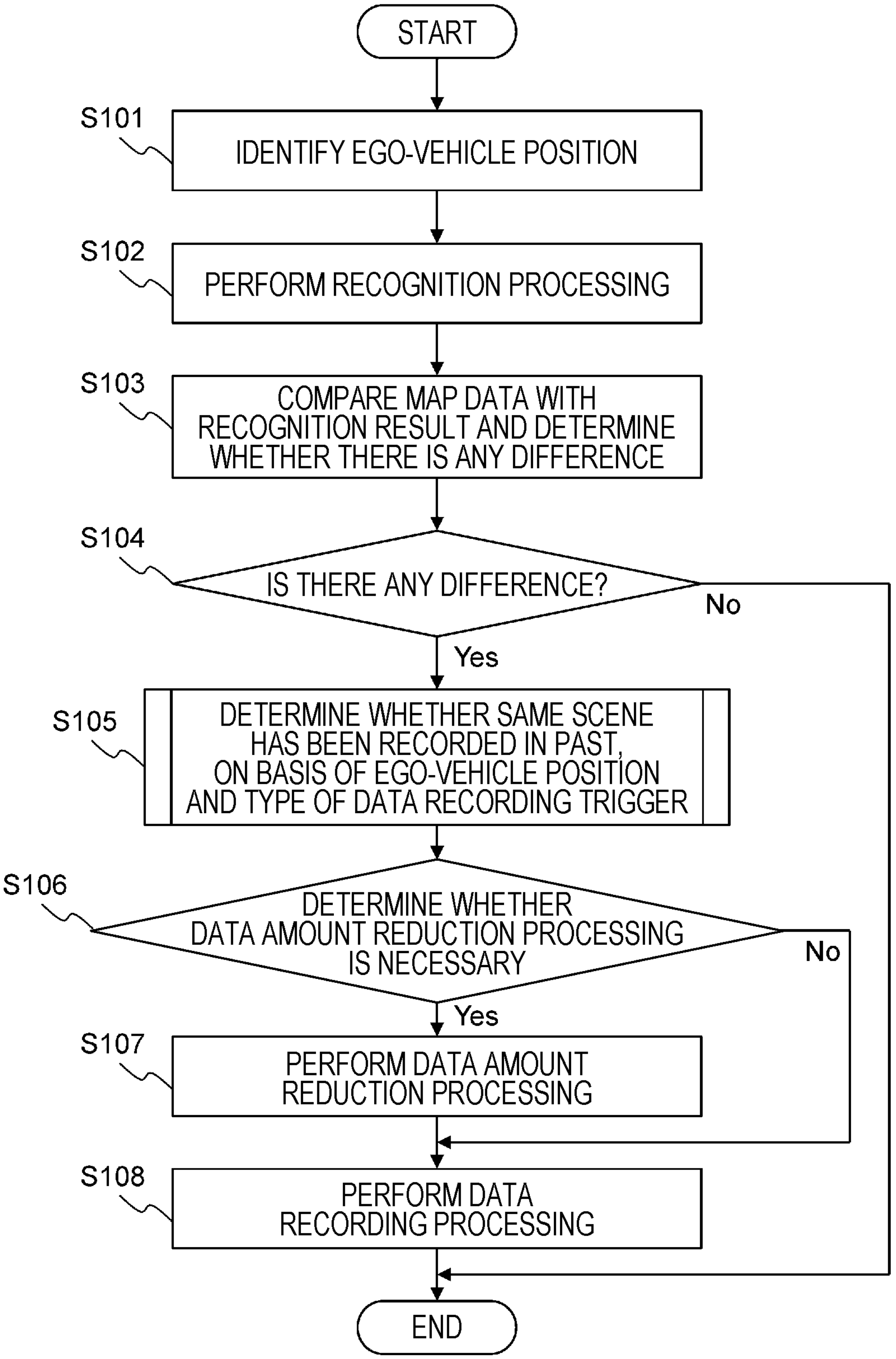
FIG. 3 is a flowchart of processing executed by the data recording apparatus according to the first embodiment.

FIG. 3 is a flowchart of processing executed by the data recording apparatus 1 according to this embodiment.

To begin with, the ego-vehicle position identifying unit 12 identifies the ego-vehicle position and the lane where the ego vehicle is travelling by referring to the information from the sensor 19 (step S101).

The recognizing unit 7 then acquires the video data 22 output from the sensor 19, recognizes objects by processing the video data 22, generates outer world recognition information indicating the recognized objects, and stores the outer world recognition information in the recognition data 15 (step S102).

The data recording trigger determining unit 9 then acquires the map data 14 around the ego-vehicle position, compares the acquired map data with the outer world recognition information, determines whether there is any difference between the map data and the outer world recognition information, selects, when there is any difference, video data related to the difference as difference data, determines a data recording trigger specifying the object representing the difference (step S103), and determines whether the difference exceeds a predetermined threshold (step S104). For example, upon recognizing a traffic sign not included in the map data 14, the difference is determined to exceed the threshold, and the traffic sign is used as the data recording trigger. Upon recognizing a visible lane marking not included in the map data 14, the difference is determined to exceed the threshold, and the visible lane marking is used as a data recording trigger. If the difference is equal to or more than the threshold (step S104: Yes), the process is shifted to step S105. If the difference is not equal to or more than the threshold (step S104: No), the process is ended.

If the difference is equal to or more than the threshold (step S104: Yes), the data amount reduction condition determining unit 10 refers to the difference data 16, performs matching of the position where the difference is recorded and the data recording trigger, and determines whether the same scene has been recorded in the past (step S105). Details of step S105 will be described with reference to FIG. 4. If the same scene has been recorded (step S106: Yes), the process is shifted to step S107. If the same scene has not been recorded yet (step S106: No), the process is shifted to step S108.

If the same scene has been recorded in the past (step S106: Yes), the data recording unit 11 executes predetermined data amount reduction processing (step S107). Examples of the data amount reduction processing include "dropping the bit rate of the video to be saved", "recording only the date and time, the position information, and the type of the data recording trigger", and "not recording any data".

Finally, the data recording unit 11 stores the data in the difference data 16, and ends the processing.

Figure 4:
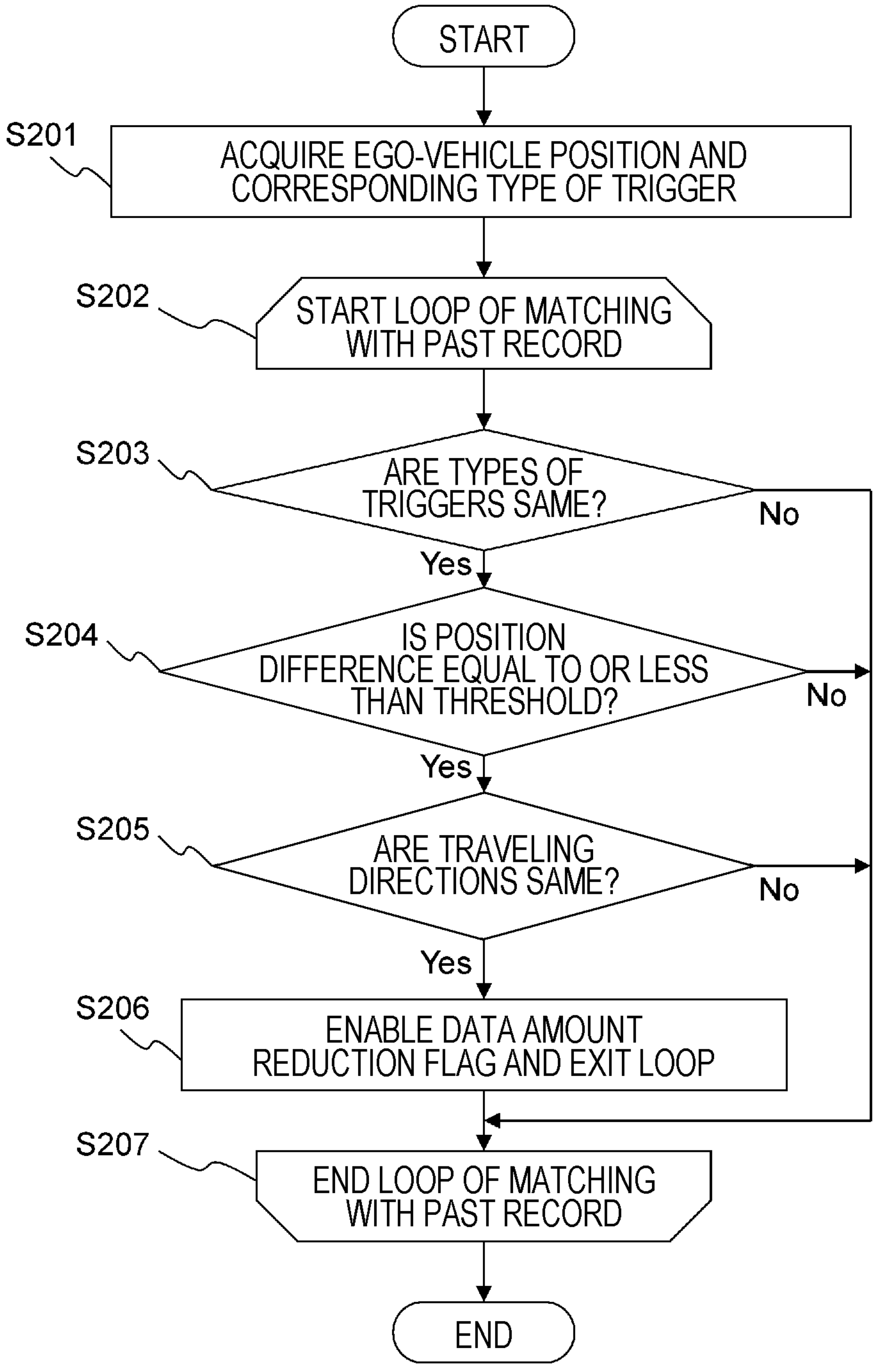
FIG. 4 is a flowchart illustrating the processing executed in step S105 in FIG. 3.

FIG. 4 is a flowchart illustrating processing executed in step S105 in FIG. 3.

To begin with, the data amount reduction condition determining unit 10 acquires the ego-vehicle position and the type of the data recording trigger corresponding thereto (step S201).

The data amount reduction condition determining unit 10 then starts a loop of referring to a piece of past recorded data from the difference data 16 (step S202).

It is then determined whether a type of the data recording trigger included in the data to be recorded is the same as that of the data recording trigger included in the past recorded data (step S203). If the types of the data recording triggers are the same (step S203: Yes), the process is shifted to step S204. If the types of the data recording triggers are different (step S203: No), the processes in steps S202 to S207 are repeated.

On the basis of the position information of the position where the data to be recorded is acquired and the position information of the position where the past recorded data is acquired, it is determined whether the position difference therebetween is equal to or less than a predetermined threshold (step S204). If the position difference is equal to or less than the threshold (step S204: Yes), the process is shifted to step S205. If the position difference is not equal to or less than the threshold (step S204: No), the processes in steps S202 to S207 are repeated.

It is also determined whether the traveling directions are the same, on the basis of the traveling lane information derived from the position information of the position at which the data to be recorded is acquired and the traveling lane information of the position at which the past recorded data is acquired (step S205). If the traveling directions are the same (step S205: Yes), the process is shifted to step S206. If the traveling directions are different (step S205: No), the processes in steps S202 to S207 are repeated.

If there is any past record satisfying all of the conditions in steps S203 to S205, it is determined that the same scene has been recorded in the past, a data amount reduction flag is enabled for the data to be recorded, and the processing exits the loop (step S206). Note that the determination in steps S203 to S205 may be made using one or more conditions, without using all of the conditions. In particular, it may be determined that the same scene has been captured as long as the positions are nearby each other and the traveling directions are the same, although the types of the data recording triggers are different.

If the matching with all of the past records has been completed, the loop is ended (step S207).

FIG. 5 is a diagram illustrating one example of a configuration of a data table that retains attribute information associated with a difference data body recorded in the difference data 16. In other words, the difference data 16 includes the data table (attribute information) and the difference data body illustrated in FIG. 5.

In the data table illustrated in FIG. 5, a record of attribute information is created for each piece of recorded difference data. The data table includes fields of: a recorded data ID indicating the association with the recorded difference data body; a date and time at which the difference data is recorded; position information (latitude, longitude) at which the difference data is recorded; a lane ID indicating the lane along which the vehicle has been traveling at the time when the difference data is recorded; and a data recording trigger ID indicating a type of the data recording trigger.

The data amount reduction condition determining unit 10 accesses this data table and performs matching with the past data.

As described above, according to the first embodiment of the present invention, when a data recording request is generated, it is determined whether there is any past recording of a scene that is the same as that of the data to be recorded, by matching the data to be recorded with the past recorded data, and the amount of data to be recorded is changed dynamically in order to avoid recording of the same scene, or to reduce the amount of data recording the same scene. Therefore, it is possible to record a larger number of scenes in the same storage capacity, and to improve map data optimization efficiency. Furthermore, because the number of writes to the memory 3 is reduced, it is possible to suppress deterioration of the memory 3.

Second Embodiment

A data recording apparatus according to a second embodiment of the present invention will now be described with reference to FIG. 6. In the second embodiment, the data amount reduction processing is different from that of the first embodiment. In the second embodiment, differences with respect to the first embodiment will be mainly explained, and descriptions of the configurations of the data recording apparatus 1 and the vehicle system 18 including the data recording apparatus 1 will be omitted, because these configurations are the same as those in the first embodiment.

FIG. 6 is a diagram illustrating an example of a configuration of a data amount reduction processing table according to a second embodiment of the present invention.

The data amount reduction processing table illustrated in FIG. 6 is referred in step S107 of the flowchart of FIG. 3.

Before the data amount reduction processing is performed, the data recording unit 11 monitors the available capacity in the difference data storage area, and dynamically changes the method for reducing the data amount, on the basis of the monitoring result. In the data amount reduction processing table, the type of recorded data and the specifications of the data are recorded in a manner associated with an available capacity of the difference data storage area. The difference data storage area may have a fixed capacity, or the capacity may change dynamically.

In the example illustrated in FIG. 6, the available capacity of the memory is classified into five levels, and the requirement of text data such as position information (ON for recording text data, OFF for not recording data) and a specification of video data (length, bit rate) are recorded correspondingly to each of such levels, and control is performed to make the amount of data to be recorded smaller, as the available capacity of the difference data storage area becomes smaller. For example, when the available capacity of the difference data storage area is 80% or more, the video data and the text data (data of the data table illustrated in FIG. 5) output from the sensor 19 are recorded as they are. When the available capacity of the difference data storage area is 80% to 50%, video data resultant of dropping the bit rate of the video data output from the sensor 19 and text data are recorded. When the available capacity of the difference data storage area is 50% to 30%, one frame of the video data (that is, a still image) and text data are recorded, instead of the moving image data. If the available capacity of the difference data storage area is 30% to 15%, the video data is not recorded, and only the text data is recorded. If the available capacity of the difference data storage area is less than 15%, the difference data is not recorded at all.

According to the second embodiment of the present invention, when there is a margin in the available capacity of the difference data storage area, the execution of the data amount reduction processing is prohibited. As a result, when there is any extra available capacity in the difference data storage area, it is possible to improve the accuracy and quality of the difference data.

Third Embodiment

A data recording apparatus according to a third embodiment of the present invention will now be described with reference to FIG. 7. In the third embodiment, the data table is different from that according to the first embodiment described above. In the third embodiment, differences with respect to the first embodiment will be mainly explained, and descriptions of the configurations of the data recording apparatus 1 and the vehicle system 18 including the data recording apparatus 1 will be omitted, because these configurations are the same as those in the first embodiment.

FIG. 7 is a diagram illustrating one example of a configuration of a data table that retains attribute information associated with a difference data body recorded in the difference data 16, according to the third embodiment of the present invention.

The data table illustrated in FIG. 7 retains the attribute information associated with the difference data body recorded in the difference data 16, and records the attribute information of the data recorded by the ego vehicle and the attribute information of the data recorded by other vehicles. That is, in the third embodiment, the difference data 16 includes the data table (attribute information) and the difference data body illustrated in FIG. 7.

In the data table illustrated in FIG. 7, a record of attribute information is created for each piece of recorded difference data. The data table includes fields specifying a recorded data ID that indicates association with the recorded difference data body; a date and time at which the difference data is recorded; position information (latitude, longitude) where the difference data is recorded; a lane ID that indicates the lane where the vehicle has been traveling at the time when the difference data is recorded; a data recording trigger ID that indicates the type of the data recording trigger; and a vehicle ID. The vehicle ID records zero for the ego vehicle, and identification information given to other vehicles.

The attribute information of the data recorded by another vehicle is acquired through vehicle-to-vehicle communication performed at some timing via the communicating unit 13, or communication with a data center.

The data amount reduction condition determining unit 10 according to the third embodiment accesses the data table illustrated in FIG. 7 and performs matching with the past recorded data. By performing matching with the past recorded data, it is possible to determine whether the ego vehicle or another vehicle has recorded the same scene in the past, as that in the data to be recorded, and to avoid recording of the same scene, or to reduce the amount of data recording the same scene, on a plurality of vehicles.

Note that the data table according to the third embodiment may be located in a data center, instead of the memory on the ego vehicle. When the data table is located in a data center, the data amount reduction condition determining unit 10 accesses the data center via the communicating unit 13, and acquires information for performing matching with the past data.

According to the third embodiment of the present invention, it is possible to perform more efficiently data deduplication between vehicles where the past scenes are recorded, to reduce memory consumption, and to improve the accuracy and the quality of difference data.

Note that the present invention is not limited to the embodiments described above, and includes various modifications and configurations equivalent thereto, within the spirit of the appended claims. For example, the detailed description of the embodiments above are provided to facilitate the understanding of the present invention, and the present invention is not necessarily limited to the configurations having all of the elements described above. Furthermore, a part of a configuration according to one embodiment may be replaced with a configuration of another embodiment. A configuration according to one embodiment may additionally include a configuration according to another embodiment. Furthermore, a part of the configuration according to one of the embodiments may be added, deleted, or replaced with a configuration of another.

Furthermore, a part or the whole of the above-described configurations, functions, processing units, processing means, and the like may be implemented as hardware through designing of an integrated circuit, for example, or may be implemented as software, by causing a processor to parse and to execute a program for implementing the functions.

Information such as a program, a table, and a file for implementing these functions may be stored in a storage device such as a memory, a hard disk, and a solid state drive (SSD), or a recording medium such as an IC card, an SD card, and a DVD.

Furthermore, the control lines and the information lines considered to be necessary in the description are illustrated, and not all of the control lines and the information lines required in the implementation are illustrated. In practice, it may be considered that almost all of these configurations are connected to one another.

The invention claimed is:

1. A data recording apparatus comprising:

a computing apparatus that executes computing processing; and a storage unit that is accessible from the computing apparatus, wherein the computing apparatus includes:

a data recording trigger determining unit in which the computing apparatus determines a difference between outer world recognition information representing a recognized object and map data around an ego-vehicle position, and establishes attribute information including a data recording trigger representing an object having resulted in the difference, as well as video data related to the difference, as difference data to be recorded;

a data amount reduction condition determining unit in which the computing apparatus compares the attribute information of the difference data to be recorded, with attribute information of difference data recorded in past, and determines whether a same scene has been recorded in the past; and a data recording unit in which the computing apparatus executes data amount reduction processing for reducing a data amount of the difference data, when the same scene has been recorded in the past.

2. The data recording apparatus according to claim 1, wherein the data amount reduction condition determining unit determines that the same scene has been recorded in the past when a difference between a position where the difference data to be recorded is acquired and a position where the difference data recorded in the past is acquired is within a predetermined threshold, and a traveling direction of a vehicle having acquired the difference data to be recorded is same as a traveling direction of a vehicle having acquired the difference data recorded in the past.

3. The data recording apparatus according to claim 1, wherein the data amount reduction condition determining unit determines that the same scene has been recorded in the past when a difference between a position where the difference data to be recorded is acquired and a position where the difference data recorded in the past is acquired is within a predetermined threshold, a traveling direction of a vehicle having acquired the difference data to be recorded is same as a traveling direction of a vehicle having acquired the difference data recorded in the past, and a type of the data recording trigger included in the difference data to be recorded is same as a type of a data recording trigger included in the difference data recorded in the past.

4. The data recording apparatus according to claim 1, wherein the data recording unit reduces a data amount of the difference data when an available capacity of an area of the storage unit is less than a predetermined threshold, the available capacity being available for recording the difference data to be recorded.

5. The data recording apparatus according to claim 1, wherein the computing apparatus includes a communicating unit that acquires attribute information of difference data recorded by another vehicle, the storage unit stores attribute information of difference data recorded by the ego vehicle and the attribute information of the difference data recorded by the other vehicle, and the data amount reduction condition determining unit compares the attribute information of the difference data to be recorded, with the attribute information of the difference data recorded by the ego vehicle and the attribute information of the difference data recorded by the other vehicle, and determines whether the same scene has been recorded in the past.

6. An electronic control apparatus provided onboard a vehicle, the electronic control apparatus comprising:

a computing apparatus that executes computing processing; and a storage unit that is accessible from the computing apparatus, wherein the computing apparatus includes:

a data recording trigger determining unit in which the computing apparatus determines a difference between outer world recognition information representing a recognized object and map data around an ego-vehicle position, and establishes attribute information including a data recording trigger representing an object having resulted in the difference, as well as video data related to the difference, as difference data to be recorded;

a data amount reduction condition determining unit in which the computing compares the attribute information of the difference data to be recorded, with attribute information of data recorded in past, and determines whether a same scene has been recorded in the past; and a data recording unit in which the computing apparatus executes data amount reduction processing for reducing a data amount of the difference data, when the same scene has been recorded in the past.

7. A data recording method executed by a data recording apparatus including a computing apparatus that executes computing processing and a storage unit that is accessible from the computing apparatus, the data recording method comprising:

a data recording trigger determining step in which the computing apparatus determines a difference between outer world recognition information representing a recognized object and map data around an ego-vehicle position, and establishes attribute information including a data recording trigger representing an object having resulted in the difference, as well as video data related to the difference, as difference data to be recorded;

a data amount reducing condition determining step in which the computing apparatus compares the attribute information of the difference data to be recorded, with attribute information of data recorded in past, and determines whether a same scene has been recorded in the past; and a data recording step in which the computing apparatus executes data amount reduction processing for reducing a data amount of the difference data, when the same scene has been recorded in the past.

* * * * *